(12) United States Patent
Radhakrishnan et al.

(10) Patent No.: US 9,888,202 B2
(45) Date of Patent: Feb. 6, 2018

(54) SEARCHING FOR BROADCAST CHANNELS BASED ON CHANNEL NAMES

(71) Applicant: Verizon Patent and Licensing Inc., Arlington, VA (US)

(72) Inventors: Vijayan Radhakrishnan, Chennai (IN); Aravind Vaidhyanathan, Chennai (IN); JanardhanReddy Tripuram, Nalgonda (IN); Kavitha PanneerSelvam, Chennai (IN); Deepak Natarajan, Coimbatore (IN); Sivasubramanian Parthasarathy, Muthialpet (IN); Venkatesan Sriraman, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 14 days.

(21) Appl. No.: 14/453,453

(22) Filed: Aug. 6, 2014

(65) Prior Publication Data
US 2016/0044272 A1    Feb. 11, 2016

(51) Int. Cl.
*H04N 5/445* (2011.01)
*H04N 5/44* (2011.01)
*H04N 21/422* (2011.01)
*H04N 21/482* (2011.01)

(52) U.S. Cl.
CPC ....... *H04N 5/4403* (2013.01); *H04N 5/44543* (2013.01); *H04N 21/42221* (2013.01); *H04N 21/4828* (2013.01); *H04N 2005/44556* (2013.01); *H04N 2005/44569* (2013.01)

(58) Field of Classification Search
CPC ............ H04N 5/4403; H04N 5/44543; H04N 5/44513; H04N 2005/44569; H04N 2005/44556
USPC .......................................... 725/37
See application file for complete search history.

(56) References Cited

U.S. PATENT DOCUMENTS

| 6,870,927 | B1 * | 3/2005 | Theis | H04M 1/274566 379/201.01 |
|---|---|---|---|---|
| 8,225,356 | B2 * | 7/2012 | Javvaji | H04N 5/44513 348/734 |
| 8,688,719 | B2 * | 4/2014 | Sekaran | G06F 17/30867 707/732 |
| 8,832,737 | B2 * | 9/2014 | Ellis | H04N 5/44543 348/734 |

(Continued)

OTHER PUBLICATIONS

Represent. Oxford Dictionaries. Oxford University Press, n.d. Web. Apr. 24, 2016. <http://www.oxforddictionaries.com/us/definition/american_english/represent>.*

(Continued)

*Primary Examiner* — Michael B Pierorazio (57) ABSTRACT

A device may receive a numeric code representing an alphanumeric character; and determine one or more programming channel names including the alphanumeric character represented by the numeric code. Each of the one or more channel names may be associated with a television broadcast network. The device may the one or more programming channel names; receive a selection of a particular programming channel, of the one or more programming channels; and present content associated with the selected programming channel.

20 Claims, 8 Drawing Sheets

(56) References Cited

U.S. PATENT DOCUMENTS

| | | | | |
|---|---|---|---|---|
| 2004/0178923 A1* | 9/2004 | Kuang | ............... | G08C 17/00 340/13.3 |
| 2005/0010947 A1* | 1/2005 | Ellis | ............... | H04N 5/44543 725/38 |
| 2005/0244208 A1* | 11/2005 | Suess | ............... | G06F 3/0202 400/486 |
| 2005/0278741 A1* | 12/2005 | Robarts | ............... | H04N 5/44543 725/46 |
| 2007/0253758 A1* | 11/2007 | Suess | ............... | G06F 3/0202 400/486 |
| 2008/0064350 A1* | 3/2008 | Winkler | ............... | H04M 3/42008 455/187.1 |
| 2009/0079813 A1* | 3/2009 | Hildreth | ............... | H04N 7/147 348/14.03 |
| 2010/0054446 A1* | 3/2010 | Braun | ............... | H04M 1/274558 379/216.01 |
| 2012/0274861 A1* | 11/2012 | Javvaji | ............... | H04N 5/44513 348/731 |
| 2014/0011546 A1* | 1/2014 | Bender | ............... | H04M 1/2471 455/566 |
| 2015/0181036 A1* | 6/2015 | Wuest | ............... | H04M 3/42306 379/221.14 |
| 2015/0255063 A1* | 9/2015 | Talwar | ............... | G10L 15/18 704/255 |

OTHER PUBLICATIONS

"Represent, v.1." OED Online. Oxford University Press, Mar. 2016. Web. Apr. 24, 2016. <http://www.oed.com/view/Entry/162991>.*

"Convert, v." OED Online. Oxford University Press, Mar. 2016. Web. Apr. 24, 2016. <http://www.oed.com/view/Entry/40777>.*

Convert. Oxford Dictionaries. Oxford University Press, n.d. Web. Apr. 24, 2016. <http://www.oxforddictionaries.com/us/definition/american_english/convert>.*

Verizon, "User Guide: Droid DNA," 2012 (available at http://d13.htc.com/htc_na/user_guides/htc_droid_dna_verizon_english_userguide_11.20.12.pdf, visited Jul. 2, 2014), p. 77.

* cited by examiner

| Numeric Code | Channel Name | Channel Number |
|---|---|---|
| 222 | AAA | 100 |
| 223 | ABD | 115 |
| ... | ... | ... |
| 4621 | HMC 1 | 123 |
| 4622 | HMC 2 | 124 |
| ... | ... | ... |

SEARCHING FOR BROADCAST CHANNELS BASED ON CHANNEL NAMES

BACKGROUND

A set-top box can display a program guide that identifies different broadcast channels and programs associated with the broadcast channels. In order for a user to select a particular channel, the user may scroll through the program guide until the channel is displayed in the program guide, and then select the desired channel. Alternatively, a user can input a channel number in order to direct the user device to tune to the desired channel.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may allow a user to search for, and tune to, a programming channel (e.g., a channel associated with broadcast programming, television programming, pay-per-view programming, and/or other programming content) based on a name of the channel. As a result, the user may not need to scroll through a program guide in order to select a desired channel. Further, the user may not need to memorize channel numbers. Scrolling through a program guide or memorizing channel numbers may be time consuming and burdensome when potentially hundreds of channels are available in a television network. In some implementations, the user may search for, and tune to, a programming channel based on the name of the channel while the live content is being displayed by the user device. Additionally, or alternatively, the user may search for, and tune to, a programming channel based on the name of the channel when the user is in a program guide that identifies the programming channels.

Figure 1:
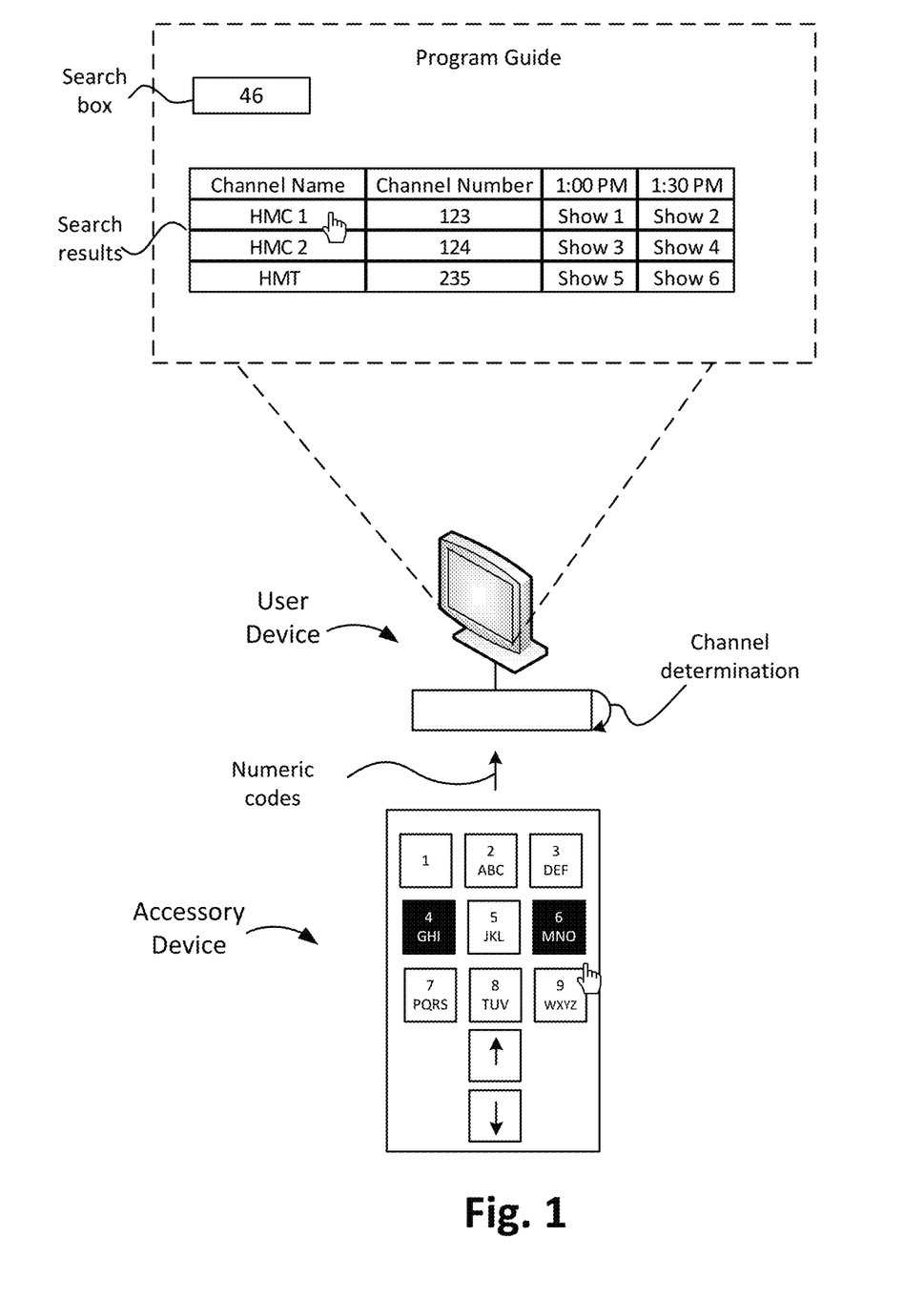
FIG. 1 illustrates an example overview of an implementation described herein.

FIG. 1 illustrates an example overview of an implementation described herein. As shown in FIG. 1, a user device (e.g., a set-top box connected to an associated display) may display a program guide that identifies a channel name, a channel number associated with the channel name, and program information associated with each channel. The program guide may display a search box that may display a search query provided by a user. For example, the user may provide the search query in order to search for a channel based on the name of the channel. In some implementations, the user may provide the search query in the form of one or more numeric codes. For example, as shown in FIG. 1, the user may enter numeric codes by selecting keys (e.g., buttons) on an accessory device (e.g., a remote control device, a smart phone, a tablet, etc.).

As the user device receives the numeric codes from the accessory device, the user device may display a list of search results containing the letters of the numeric code. For example, when the user enters the numeric code "4," the user device may list search results identifying channel names beginning with the letters "G," "H," or "I." When the user device receives the numeric code "6" after receiving the numeric code "4," the user device may update the search results to identify channels having names beginning with the letters "G," "H," or "I" followed by the letters "M," "N," or "O." Alternatively, the user device may delay displaying search results until a particular amount of time has passed (e.g., to allow for a user to enter multiple digits as part of a single search query). As shown in FIG. 1, the user may select, from the list of channel names, a desired channel (e.g., the channel "Home Movie Channel" or "HMC"). As a result, the user may not need to scroll through a program guide in order to select a desired channel. Further, the user may not need to memorize channel numbers.

Figure 2:
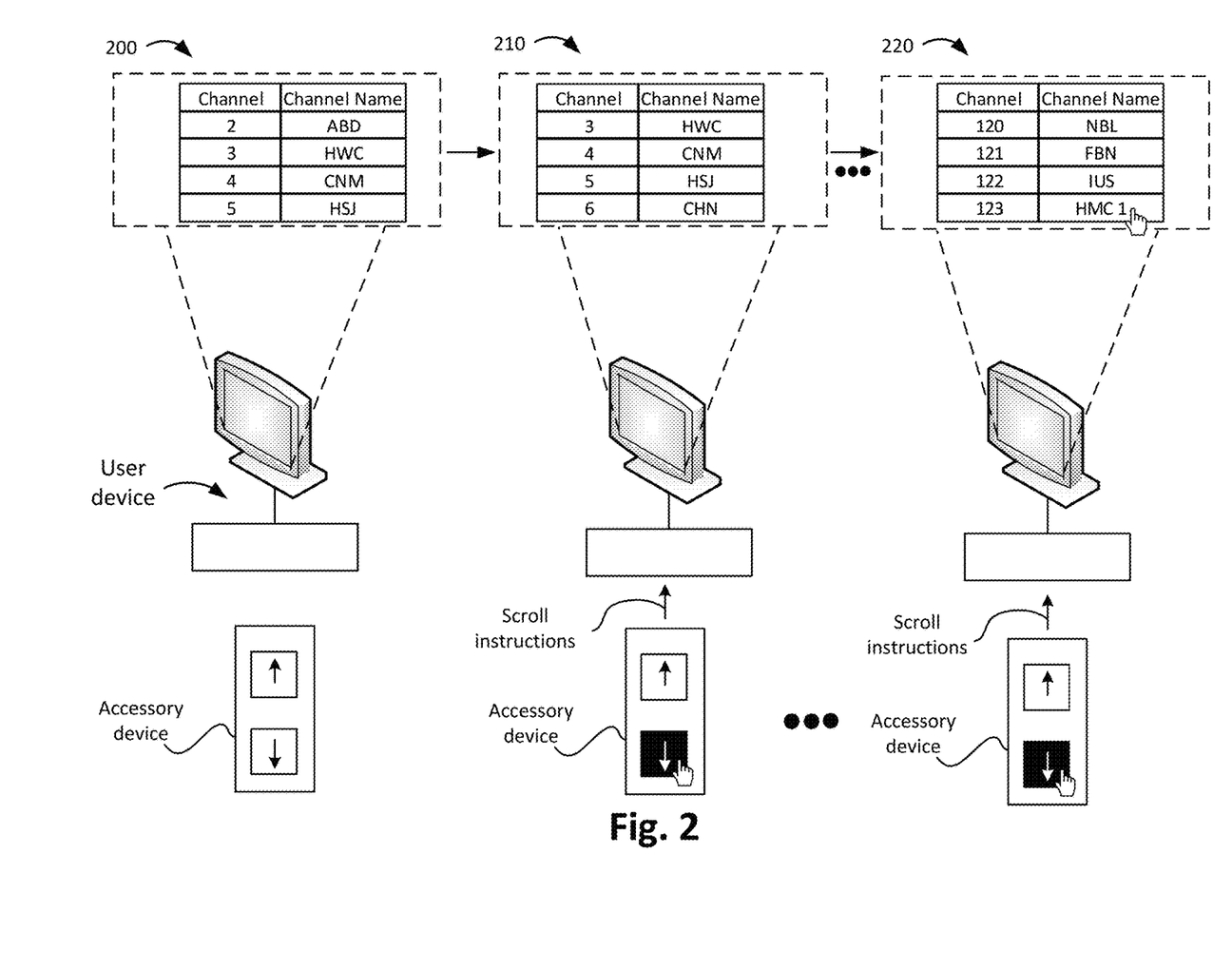
FIG. 2 illustrates an example where searching for a channel based on a channel name may be desirable.

FIG. 2 illustrates an example where searching for a channel based on a channel name may be desirable. As shown in FIG. 2, a user may need to continuously select to scroll through a program guide in order to find a desired channel. For example, referring to interface 200, the program guide may currently display program information for channels 2 through 5. As shown in interface 210, the program guide may display program information for channels 3 through 6 after the user selects a key on the accessory device to scroll downward through the program guide. That is, the user may scroll through the program guide by pressing a scrolling key on the accessory device. In order for the user to find the channel having the channel name "HMC 1" the user may need to manually scroll through the program guide (e.g., by continuously pressing a scrolling key on the accessory device) until the channel having the name "HMC 1" is displayed. Referring to interface 220, the user may select the desired channel only after having manually scrolled through the program guide until the desired channel has been displayed.

Figure 3:
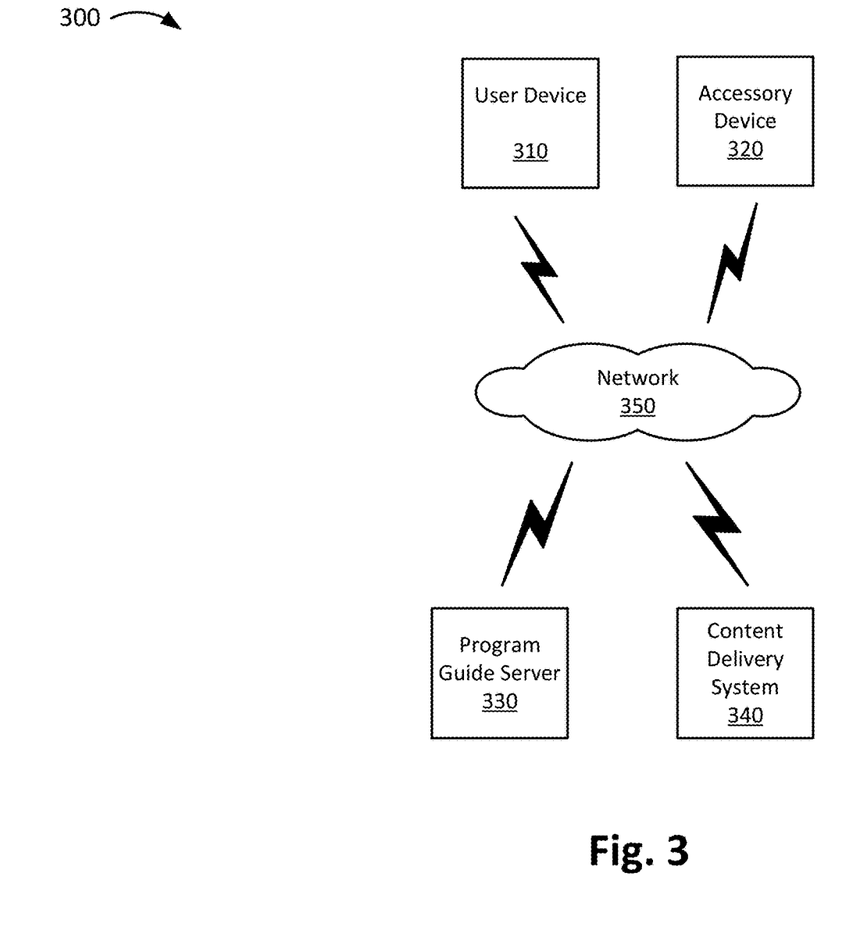
FIG. 3 illustrates an example environment in which systems and/or methods, described herein, may be implemented.

FIG. 3 is a diagram of an example environment 300 in which systems and/or methods described herein may be implemented. As shown in FIG. 3, environment 300 may include user device 310, accessory device 320, program guide server 330, content delivery system 340, and network 350.

User device 310 may include a device capable of communicating via a network, such as network 350. For example, user device 310 may be a set-top box, or a set-top box connected to a television. In some implementations, user device 310 may be a portable computer device (e.g., a laptop or a tablet computer), a desktop computer device, a television, and/or another type of device. In some implementations, user device 310 may present a program guide identifying program information for broadcast content and/or some other type of content. The program guide may include information received from program guide server 330. User device 310 may store information identifying numeric codes associated with channel names identified by the program guide. In some implementations, user device 310 may store information identifying custom instructions associated with a numeric code or particular key.

User device 310 may receive, from accessory device 320, signals and/or messages identifying keys selected on accessory device 320 by a user. As an example, user device 310 may receive signals and/or messages identifying the selection of numeric keys on accessory device 320 (e.g., user device 310 may receive numeric codes in the form of signals and/or messages identifying the selection of corresponding numeric keys). When receiving the numeric codes as part of a search query, user device 310 may identify a channel name based on the numeric codes, and output search results identifying channel names associated with the numeric codes. In some implementations, user device 310 may store user viewing history, and sort the search results based on the users viewing history (e.g., the search results may be sorted in order of most viewed channels to least viewed channels). User device 310 may receive a selection for content, and may communicate with content delivery system 340 to receive and display the content.

Accessory device 320 may include a device that may communicate with user device 310 in order to output information regarding user inputs to user device 310. For example, accessory device 320 may include a remote control device (e.g., an infrared remote control device, a radio frequency (RF) remote control device, or the like), a mobile communication device, a portable computer device, a desktop computer device, etc. In some implementations, accessory device 320 may include one or more physical or virtual keys that may control the operation of user device 310. For example, accessory device 320 may include a scroll key to direct user device 310 to scroll through a channel guide in a particular direction. Additionally, or alternatively, accessory device 320 may include a numeric keypad or an alphanumeric keypad. In some implementations, each number in the numeric keypad may be mapped to one or more letters. For example, the numbers may be mapped to one or more letters in accordance with a telephone keypad layout. In some implementations, accessory device 320 may be integrated within user device 310. For example, user device 310 may include physical keys to receive user inputs (e.g., selections of particular keys on accessory device 320). Additionally, or alternatively, user device 310 may implement virtual keys on a display of user device 310 to receive user inputs (e.g., an on-screen keyboard).

When accessory device 320 includes an RF remote control, accessory device 320 may output a signal at a particular frequency based on the particular key selected by the user. When accessory device 320 includes an infrared remote control, accessory device 230 may output, based on receiving a selection of a key, a signal in the form of a pulse of light representing a binary code corresponding to the selected key. Additionally, or alternatively, accessory device 320 may output an Internet protocol (IP) based message indicating the selection of a key. In situations where user device 310 and accessory device 320 are implemented on the same device, accessory device 320 may output an inter-application, inter-service, or intra-application message or function call based on receiving a selection of a key. User device 310 may receive signals and/or messages outputted by accessory device 320 (e.g., signals and/or messages identifying the selection of one or more keys or keys).

Program guide server 330 may include one or more computing devices, such as a server device or a collection of server devices. In some implementations, program guide server 330 may store program information based on broadcast channel and broadcast time. Program guide server 330 may output the program information to user device 310 for display in a program guide.

Content delivery system 340 may include one or more computing devices, such as a server device or a collection of server devices. In some implementations, content delivery system 340 may be part of a video or broadcasting head-end system and/or some other type of content delivery system. Content delivery system 340 may output content that user device 310 may receive and display.

Network 350 may include one or more wired and/or wireless networks. For example, network 350 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 350 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, an RF network, an infrared network, and/or a combination of these or other types of networks.

The quantity of devices and/or networks in environment 300 is not limited to what is shown in FIG. 3. In practice, environment 300 may include additional devices and/or networks; fewer devices and/or networks; different devices and/or networks; or differently arranged devices and/or networks than illustrated in FIG. 3. Also, in some implementations, one or more of the devices of environment 300 may perform one or more functions described as being performed by another one or more of the devices of environment 300. Devices of environment 300 may interconnect via wired connections, wireless connections, or a combination of wired and wireless connections.

Figure 4:
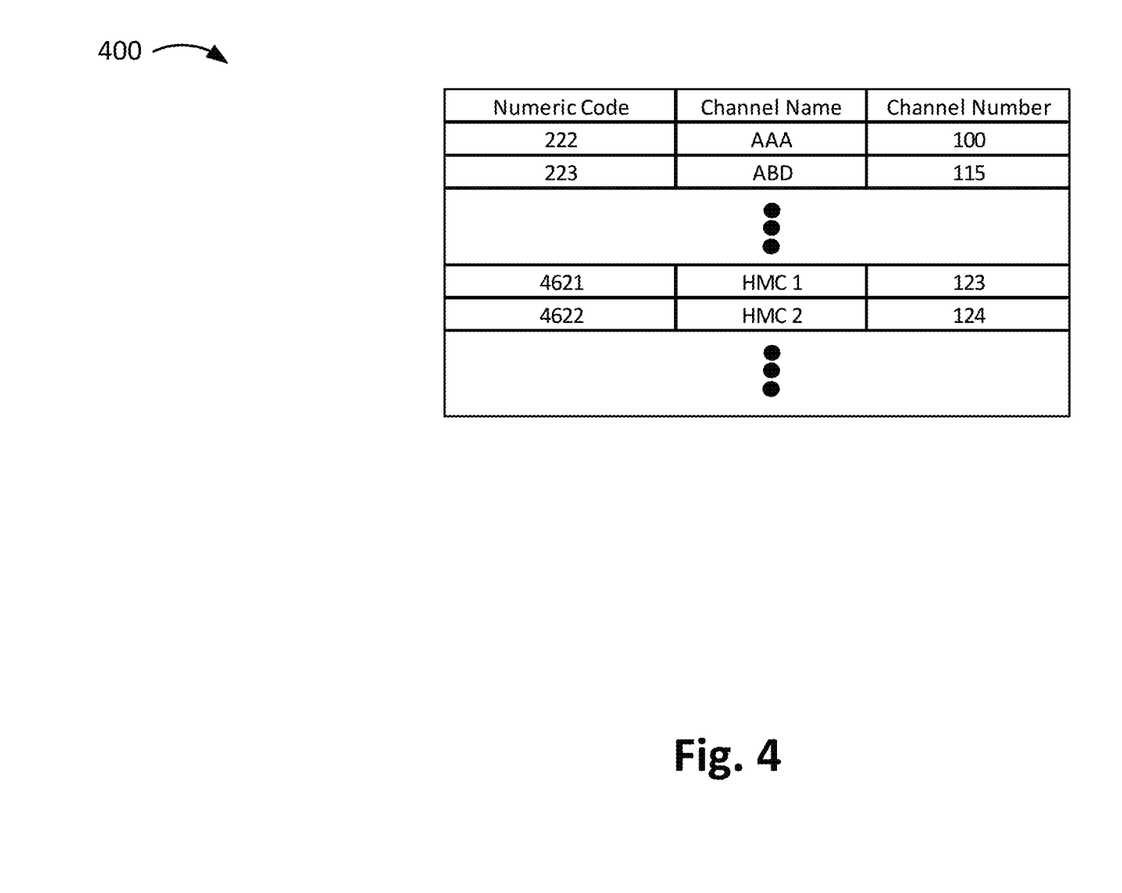
FIG. 4 illustrates an example data structure that may store information mapping numeric codes with channel names and channel numbers.

FIG. 4 illustrates an example data structure 400 that may store information mapping numeric codes with channel names and channel numbers. In some implementations, data structure 400 may be stored in a memory of user device 310. In some implementations, data structure 400 may be stored in a memory separate from, but accessible by, user device 310 (e.g., a "cloud" storage device). In some implementations, data structure 400 may be stored by some other device in environment 200, such as accessory device 320, program guide server 330, and/or content delivery system 340. A particular instance of data structure 400 may contain different information and/or fields than another instance of data structure 400.

Each entry in data structure 400 may store information identifying a numeric code, a channel name associated with the numeric code, and a channel number associated with the numeric code. In the example shown in FIG. 4, the numeric codes may be based on a telephone keypad layout or mapping scheme. As an example, data structure 400 may store information identifying that the numeric code of "222" is associated with the channel name of "ABC" (e.g., since the number "2" maps the letters "A," "B," or "C." Data structure 400 may also store information identifying the channel number associated with a channel name (e.g., based on information received from program guide server 330).

As described in greater detail below, user device 310 may convert channel names to numeric codes, and store information identifying the numeric codes of the channel names in data structure 400. Information stored by data structure 400 may then be used to identify channels associated with a numeric code received from accessory device 320.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible. For example, the numeric codes may be based on some other layout or mapping scheme. For example, data structure 400 may store custom instructions associated with a particular numeric code or key sequence. As an example, data structure 400 may store an instruction to direct user device 310 to display a custom channel list when user device 310 receives, from accessory device 320, information identifying the selection of particular keys corresponding to the particular numeric code or key sequence.

Figure 5:
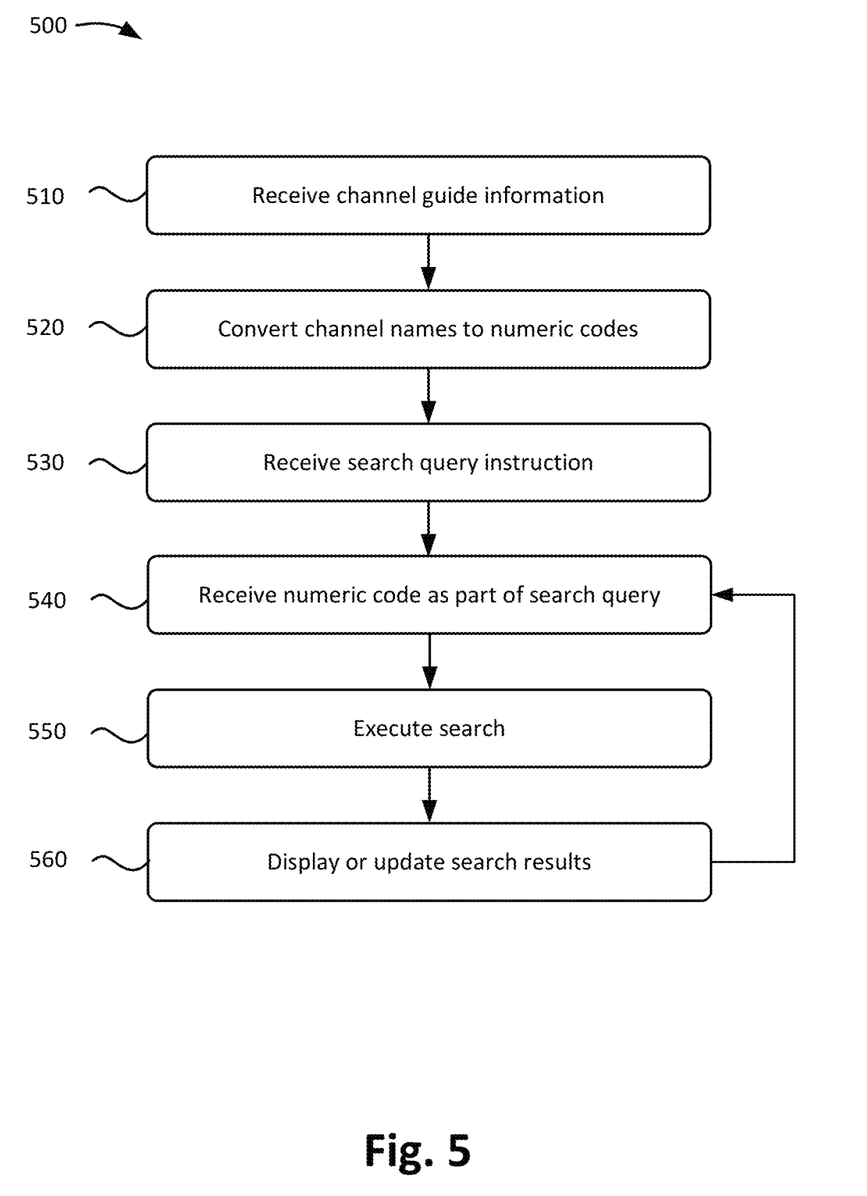
FIG. 5 illustrates a flowchart of an example process for receiving a search query for a channel based on a name of the channel, and outputting search results associated with the query.

FIG. 5 illustrates a flowchart of an example process 500 for receiving a search query for a channel based on a name of the channel, and outputting search results associated with the query. In some implementations, process 500 may be performed by user device 310. In some implementations, some or all of blocks of process 500 may be performed by one or more other devices.

As shown in FIG. 5, process 500 may include receiving channel guide information (block 510). For example, user device 310 may receive channel guide information from program guide server 330. In some implementations, the channel guide information may identify channel numbers, channel names associated with the channel numbers, and program information associated with the channel numbers.

Process 500 may also include converting the channel name to numeric codes (block 520). For example, user device 310 may convert the channel names to numeric codes based on a particular layout and/or mapping scheme that maps letters to numbers. As an example, user device 310 may convert the channel names to numeric codes using a telephone keypad layout. Alternatively, user device 310 may convert the channel names to numeric codes using some other type of layout. In some implementations, user device 310 may store information identifying the numeric codes associated with channel names in data structure 400. In FIG. 5, assume that channel names are converted to numeric codes using a telephone keypad layout.

Process 500 may further include receiving a search query instruction (block 530). For example, user device 310 may receive the search query instruction to permit a user of user device 310 to search for a channel based on a name of the channel. In some implementations, the search query instruction may correspond to a particular key selection sequence (e.g., a "long-press" of a particular key on accessory device 320, a "double-click" of a particular key on accessory device 320, a "triple-click" of a particular key on accessory device 320, a "single-click" of a particular key dedicated to the search query instruction, etc.). User device 310 may receive the search query instruction when the user selects the particular key selection sequence on accessory device 320.

Based on receiving the search query instruction, user device 310 may display a search box where the user may enter the search query. Additionally, or alternatively, user device 310 may display an indication that a search mode has been activated, and that user device 310 is prepared to receive a search query. Additionally, or alternatively, user device 310 may output an audible indication that a search mode has been activated, and that user device 310 is prepared to receive a search query.

Process 500 may further include receiving a numeric code as part of a search query (block 540). For example, user device 310 may receive a numeric code from accessory device 320 (e.g., when a user selects a key associated with a particular digit) as part of a search query. As an example, user device 310 may receive the numeric code "4" when accessory device 320 receives a selection of a key corresponding to the digit "4." In some implementations, user device 310 may receive letters as part of the search query. For example, user device 310 may receive a letter from accessory device 320 (e.g., when accessory device includes a keyboard).

Process 500 may also include executing a search (block 550). For example, user device 310 may execute the search based on receiving the search query. In some implementations, user device 310 may execute the search by identifying one or more channels associated with the numeric code. For example, user device 310 may identify one or more channels associated with the numeric code based on information stored by data structure 400 and based on converting the channel names to numeric codes. Continuing with the above assumption that user device 310 receives the numeric code "4," and that user device 310 converts the channel names to numeric codes using the telephone keypad layout, user device 310 may identify one or more channels whose names contain the letters "G," "H," or "I," or contain the digit "4." For example, user device 310 may identify one or more channels whose names begin the letters "G," "H," or "I," or the digit "4." In some implementations, user device 310 may also identify channel numbers including the digit "4." For example, user device 310 may identify channel numbers 400, 401, 402, 403, 404, etc.

In some implementations (e.g., when the search query includes letters), user device 310 may identify channels containing the letters in the search query. In some implementations, user device 310 may identify channels when the search query includes both letters and numeric codes. For example, assume that a search query includes the characters "A," "2," and "C." Given this assumption, user device 310 may identify channels whose name contains the characters "A," and "C," in addition to characters corresponding to the numeric code of "1" (e.g., the characters "2," "A," "B," or "C.").

Process 500 may further include displaying or updating search results (block 560). For example, user device 310 may display a list of the one or more identified channels. Continuing with the above example, user device 310 may display a list of channels whose names begin with the letters "G," "H," or "I" or the digit "4." In some implementations, user device 310 may sort the list of channels alphabetically. Additionally, or alternatively, user device 310 may sort the list of channels based on a measure of popularity of the channels. Additionally, or alternatively, user device 310 may sort the list of channels based on user viewing history (e.g., the list of channels may be sorted in order of most viewed channels to least viewed channels). Additionally, or alternatively, user device 310 may sort the list of channels based on another technique.

As shown in FIG. 5, process blocks 540, 550, and 560 may repeat. For example, user device 310 may receive a second numeric code as part of the search query (block 540). As an example, assume that user device 310 receives the numeric code "6" (e.g., when the user selects a key corresponding to the digit "6" after selecting the key corresponding to the digit "4"). Given this assumption, user device 310 may executing a search (block 550) to identify one or more channels whose names contain the letters (or digits) associated with the numeric codes of "4" and "6" (e.g., contain one of the letters "G," "H," or "I" or the digit "4" and one of the letters "M," "N," or "O" or the digit "6"). For example, user device 310 may identify one or more channels whose name begins with the letters "G," "H," or "I" or the digit "4," and whose second character is the letters "M," "N," or "O," or the digit "6." User device 310 may then update the search results to display the identified channels (block 560).

Continuing with the above example, assume that user device 310 receives a third numeric code as part of the search query (block 540). As an example, assume that user device 310 receives the numeric code "2" (e.g., when the user selects a key corresponding to the digit "2" after selecting the keys corresponding to the digits "4" and "6," respectively). Given this assumption, user device 310 may execute the search (block 550) to identify one or more channels whose names contain the letters (or digits) associated with the numeric codes of "4," "6," and "2" (e.g., contain one of the letters "G," "H," or "I" or the digit "4" one of the letters "M," "N," or "O" or the digit "6," and one of the letters "A," "B," or "C" or the digit "2"). For example, user device 310 may identify one or more channels whose name begins with the letters "G," "H," or "I" or the digit "4," whose second character is the letters "M," "N," or "O," or the digit "6," and whose third character is the letters "A," "B," or "C" or the digit "2." User device 310 may then update the search results to display the identified channels (block 560).

As a result, search results may be updated in real time as user device 310 receives additional numeric codes as part of the search query. That is, as the user individually selects keys on accessory device 320, user device 310 may execute a search to identify channel names each time a key is individually selected. Alternatively, user device 310 may withhold executing the search until after receiving a search query containing multiple characters (e.g., multiple digits corresponding to a numeric code), and after receiving a selection to execute the search (e.g., when the user selects one or more keys indicating that the user has completed entry of the search query, and that the search should be executed).

While FIG. 5 is described in terms of a search query including one or more numeric codes, in practice, user device 310 may receive a search query having letters and/or other characters. User device 310 may execute the search to identify program names containing the letters and/or other characters identified in the search query. As described above, user device 310 may execute the search as each character is individually inputted, or may execute the search after a search query has been inputted and after receiving an instruction to execute the search. In some implementations, user device 310 may also search for program names in addition to or in alternative of searching for channels based on channel names.

Figure 6:
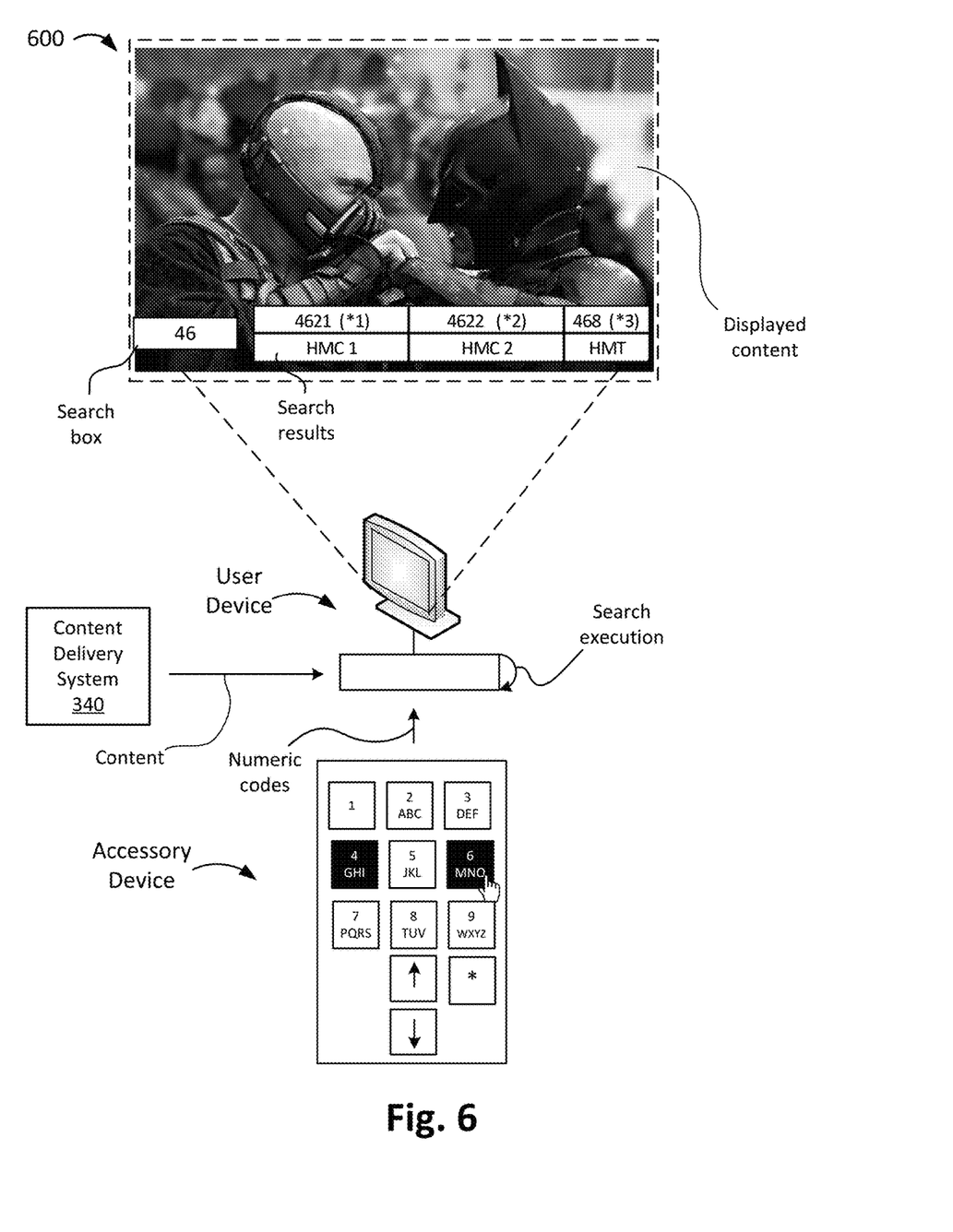
FIGS. 6 and 7 illustrate example implementations for searching for a channel based on a name of the channel while displaying broadcasted content.
Figure 7:
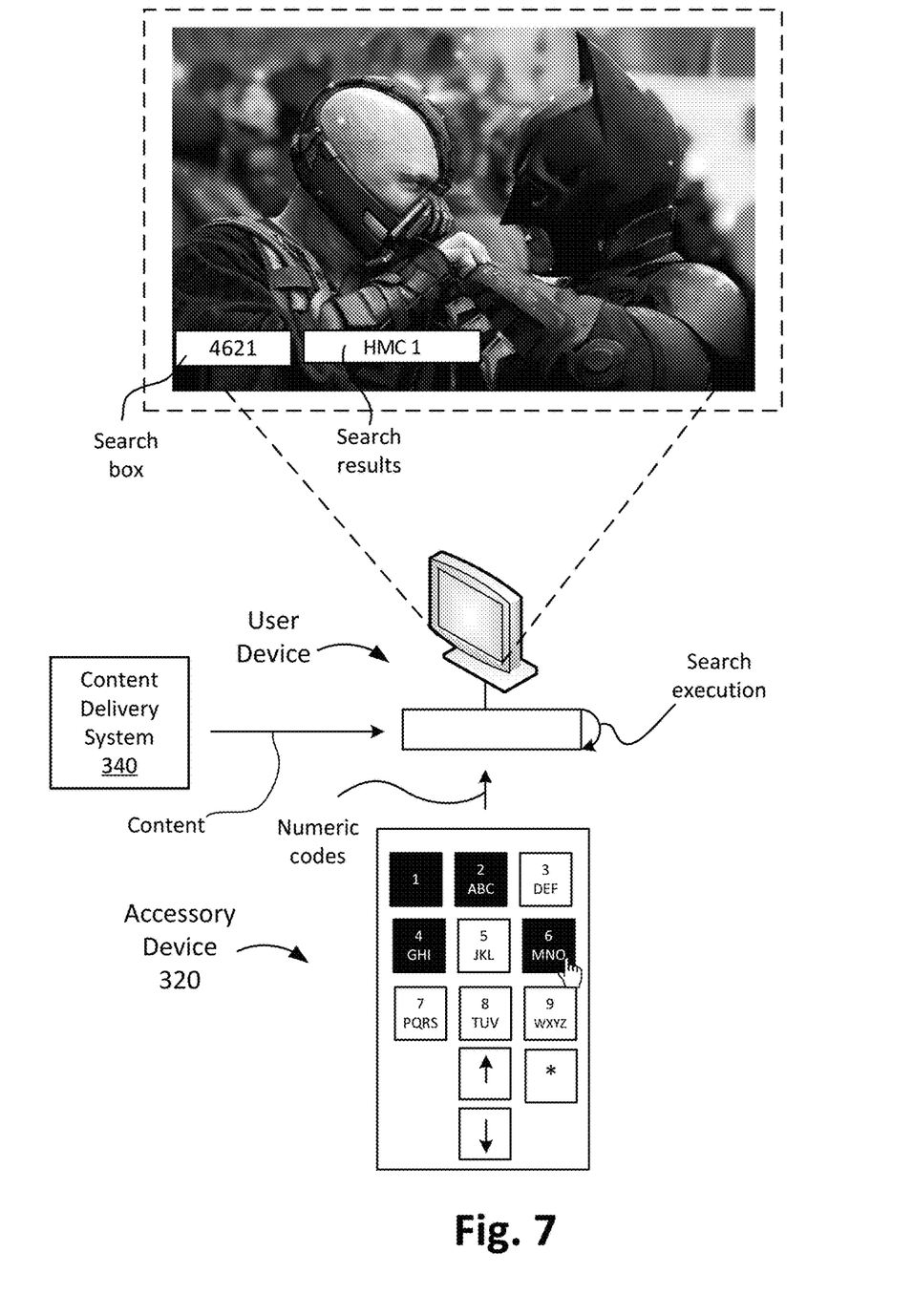

FIGS. 6 and 7 illustrate example implementations for searching for a channel based on a name of the channel while displaying broadcasted content. As shown in FIG. 6 user device 310 may display content received from content delivery system 340 (e.g., content associated with a broadcast channel and/or other content). While the content is being display, user device 310 may receive a search query instruction and may display a search box as shown in interface 600. User device 310 may receive a search query, and may display characters associated with the search query in the search box. For example, user device 310 may receive the numeric codes "4" and "6" as part of the search query from accessory device 320 (e.g., when a user selects the keys corresponding to the codes "4" and "6").

As user device 310 individually receives the numeric codes as part of the search query, user device 310 may execute a search to identify channel names corresponding to the received numeric codes. For example, after receiving the numeric code of "4," user device 310 may identify one or more channels whose names begin the letters "G," "H," or "I," or the digit "4." User device 310 may then display a list of channels whose names begin the letters "G," "H," or "I," or the digit "4" (not shown). After receiving the numeric code "6" user device 310 may identify one or more channels whose name begins with the letters "G," "H," or "I" or the digit "4," and whose second character is the letters "M," "N," or "O," or the digit "6." User device 310 may then update the search results to display the identified channels (e.g., as shown in interface 600). In the example shown in FIG. 6, user device 310 may display a list of channels including "HMC 1," "HMC 2," and "HMT." The user may scroll through the search results (e.g., using accessory device 320) to select a particular channel identified in the list of channels.

As further shown in FIG. 6, user device 310 may display a completed numeric code associated with each of the channels. For example, the numeric code "4621" may be displayed above the channel name for "HMC 1" (e.g., since the numeric codes "4," "6," "2," and "1" correspond to the channel name of "HMC 1." The completed numeric code may be presented so that the user may continue to enter numeric codes in the search box in order to select a particular channel. In some implementations, user device 310 may "auto-complete" the search query based on receiving indication of the selection of a particular key from accessory device 320. As further shown in FIG. 6, a shortcut command may be displayed for each listed channel. For example, the shortcut *1 may be displayed for the channel "HMC 1." The shortcut command may be presented so that the user may enter the shortcut command in order to select a particular channel. For instance, if the user selects the sequence *1 after the shortcut command is displayed, user device 310 may tune to the channel "HMC 1."

In some implementations, user device 310 may automatically select a channel after a threshold period of time (e.g., user device 310 may automatically select the first channel in the list if no other commands have been received from accessory device 320 within a threshold period of time, such as after 2 seconds, 3 seconds, or other period of time). After user device 310 has received a selection of a channel (or has automatically selected a channel), user device 310 may tune to the selected channel and communicate with content delivery system 340 to obtain content corresponding to the selected channel.

Referring to FIG. 7, user device 310 may continue to receive numeric codes are part of the search query. For example, as shown in interface 700, user device 310 may receive the numeric codes "2" and "1" after having had received the numeric codes "4" and "6." After receiving the numeric codes "2" and "1," user device 310 may update the search results to show a list of channels whose name contains the characters corresponding to the numeric codes "4," "6," "2," and "1." For example, user device 310 may update the search results. In the example of FIG. 7, the updated search results may only include the channel "HMC 1" (e.g., since no other channels have names that contain characters associated with the numeric codes "4," "6," "2,"

and "1."). In some implementations, user device 310 may automatically select the channel "HMC 1" without displaying the search results since the channel "HMC 1" is the only channel corresponding to the numeric codes in the search query.

While particular examples are shown in FIGS. 6 and 7, the above description is merely an example implementation. In practice, other examples are possible from what is described above in FIGS. 6 and 7. Also, while a particular format of interface 600 and interface 700 is shown, in practice, interface 600 and interface 700 may have different formats and appearance than what is shown in FIGS. 6 and 7.

Figure 8:
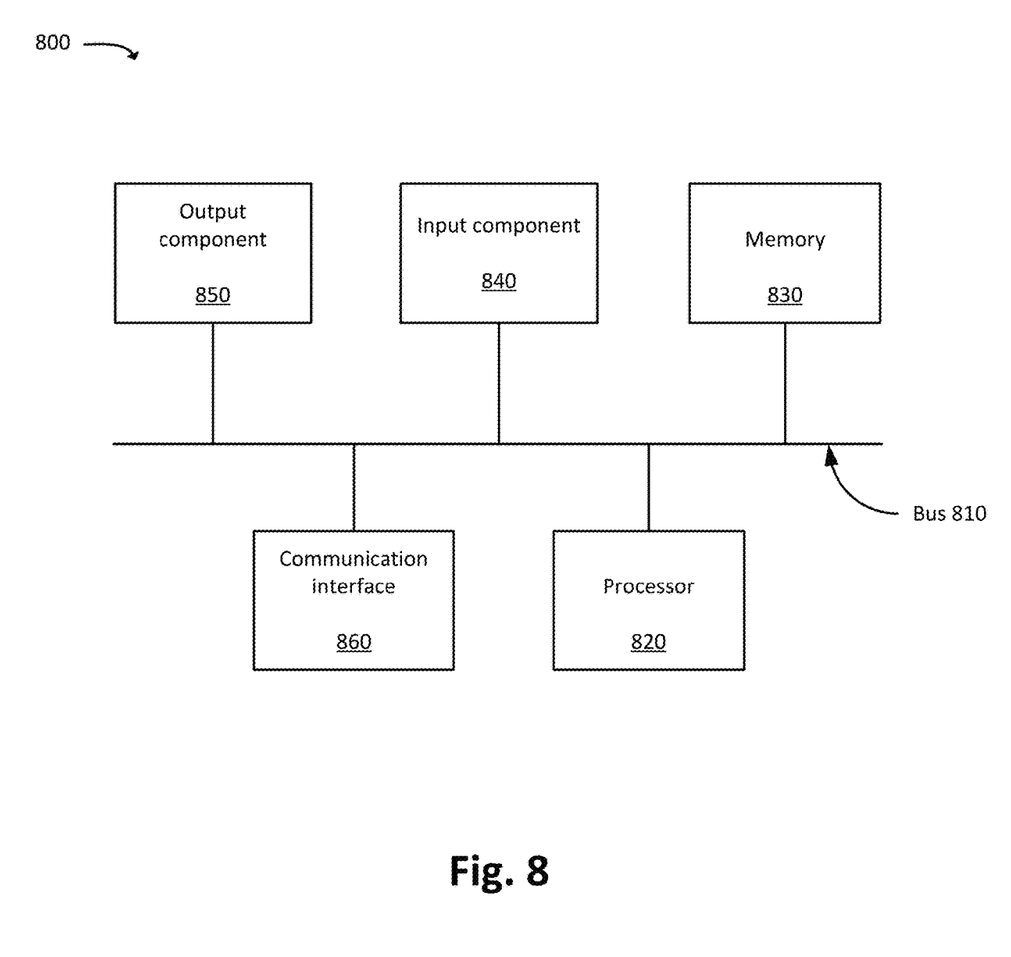
FIG. 8 illustrates example components of one or more devices, according to one or more implementations described herein.

FIG. 8 is a diagram of example components of device 800. One or more of the devices described above (e.g., with respect to FIGS. 1-3, 6, and 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a key, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 5, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1-3, 6, and 7), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by a device, a numeric code that includes at least one number;
   determining, by the device, one or more alphabetic characters that are mapped to the at least one number included in the received numeric code;
   determining, by the device, a plurality of programming channel names that each correspond to the numeric code, the determining including:
      determining that each programming channel name, of the plurality of programming channel names, includes at least one of the one or more alphabetic characters that are mapped to the at least one number included in the received numeric code,
      each programming channel name, of the plurality of programming channel names, being associated with a particular television broadcast network out of a plurality of television broadcast networks, each television broadcast network being associated with a respective programming channel number in addition to a respective programming channel name, the respective programming channel numbers being independent of the numeric code;
   associating, by the device, each programming channel name, of the plurality of programming channel names, with a respective shortcut command, wherein the shortcut commands are independent of the programming channel names and numbers;
   presenting, by the device, the plurality of programming channel names that correspond to the numeric code, the presenting including:
      presenting the respective shortcut command associated with each programming channel name, of the plurality of programming channel names;
   receiving, by the device, after receiving the numeric code, and after presenting the shortcut commands, a particular one of the shortcut commands;
   determining, by the device, which particular programming channel name, of the plurality of programming channel names, corresponds to the received shortcut command;
   selecting, by the device and based on determining that the particular programming channel name corresponds to the received shortcut command, a particular programming channel, represented by the particular programming channel name, for presentation; and
   presenting, by the device, content associated with the selected particular programming channel.

2. The method of claim 1, further comprising:
   receiving information identifying the plurality of programming channel names, each programming channel name including at least one letter; and
   converting the plurality of programming channel names to respective numeric codes,
   wherein determining the particular programming channel name is based on converting the plurality of programming channel names to the respective numeric codes.

3. The method of claim 2, wherein converting the plurality of programming channel names to the respective numeric codes includes converting the plurality of programming channel names to the respective numeric codes based on a telephone keypad layout,
   wherein the telephone keypad layout includes a plurality of keys that are associated with a plurality of letters.

4. The method of claim 1, wherein the numeric code is a first numeric code, and the one or more alphabetic characters are a first set of alphabetic characters, the method further comprising:
   receiving a second numeric code;
   determining a second set of alphabetic characters mapped to one or more numbers included in the second numeric code;
   determining an update list identifying one or more programming channel names including:
      the first set of alphabetic characters associated with the first numeric code, and
      the second set of alphabetic characters associated with the second numeric code; and
   displaying the updated list of the one or more programming channel names.

5. The method of claim 1, wherein receiving the numeric code includes receiving the numeric code from an accessory device, the accessory device including at least one of:
   an infrared remote control device,
   a radio frequency remote control device, or
   a user device.

6. The method of claim 1, wherein the device includes a set-top box.

7. The method of claim 1, further comprising displaying the plurality of programming channel names and the corresponding shortcut commands in a program guide or over broadcast content being output by the device.

8. The method of claim 1, wherein at least one of the shortcut commands includes a non-alphanumeric symbol.

9. A system comprising:
   a non-transitory memory device storing a plurality of processor-executable instructions; and
   a processor configured to execute the processor-executable instructions, wherein executing the processor-executable instructions causes the processor to:
      receive a numeric code that includes at least one number;
      determine a set of alphabetic characters that are mapped to the at least one number included in the numeric code;
      determine a plurality of programming channel names that each correspond to the numeric code, wherein the processor-executable instructions to determine the particular programming channel name include processor-executable instructions to:
         determine that each programming channel name, of the plurality of programming channel names, includes at least one of the alphabetic characters in the determined set of alphabetic characters,
         each programming channel name, of the plurality of programming channel names, being associated with a particular television broadcast network out of a plurality of television broadcast networks, each television broadcast network being associated with a respective programming channel number in addition to a respective programming channel name, the respective programming channel numbers being independent of the numeric code;

associate each programming channel name, of the plurality of programming channel names, with a respective shortcut command, wherein the shortcut commands are independent of the programming channel names and numbers;

present the plurality of programming channel names that correspond to the numeric code, the presenting including:
presenting the respective shortcut command associated with each programming channel name, of the plurality of programming channel names;

receive, after receiving the numeric code and after presenting the shortcut commands, a particular one of the shortcut commands;

determine which particular programming channel name, of the plurality of programming channel names, corresponds to the received shortcut command;

select, based on determining that the particular programming channel name corresponds to the received shortcut command, a particular programming channel, represented by the particular programming channel name, for presentation; and present content associated with the selected particular programming channel.

10. The system of claim 9, wherein executing the processor-executable instructions further causes the processor to:
receive information identifying the plurality of programming channel names, each programming channel name including at least one letter; and
convert the plurality of programming channel names to respective numeric codes, including converting the at least one letter, of each programming channel name, to a respective numeric code,
wherein executing the processor-executable instructions, to determine the particular programming channel name, causes the processor to determine the particular programming channel name based on converting the plurality of programming channel names to the respective numeric codes.

11. The system of claim 10, wherein executing the processor-executable instructions, to convert the plurality of programming channel names to the respective numeric codes, causes the processor to convert the plurality of programming channel names to the respective numeric codes based on a telephone keypad layout,
wherein the telephone keypad layout includes a plurality of keys that are associated with a plurality of letters.

12. The system of claim 9, wherein the numeric code is a first numeric code, and the set of alphabetic characters is a first set of alphabetic characters, wherein executing the processor-executable instructions further causes the processor to:
receive a second numeric code;
determine a second set of alphabetic characters that are mapped to one or more numbers included in the second numeric code;
determine an update list identifying one or more programming channel names that include:
the first set of alphabetic characters associated with the first numeric code, and
the second set of alphabetic characters associated with the second numeric code; and display the updated list of the one or more programming channel names.

13. The system of claim 9, wherein executing the processor-executable instructions, to receive the numeric code causes the processor to receive the numeric code from an accessory device, the accessory device including at least one of:
an infrared remote control device,
a radio frequency remote control device, or
a user device.

14. The system of claim 9, further including a set-top box that includes the non-transitory memory device and the processor.

15. The system of claim 9, wherein executing the processor-executable instructions further cause the processor to display the plurality of programming channel names and the corresponding shortcut commands in a program guide or over broadcast content being output by the device.

16. The system of claim 9, wherein at least one of the shortcut commands includes a non-alphanumeric symbol.

17. A non-transitory computer-readable medium, storing:
a plurality of instructions which, when executed by one or more processors associated with a device, cause the one or more processors to:
receive a numeric code that includes at least one number;
determine a set of alphabetic characters that are mapped to the at least one number included in the numeric code;
determine a plurality of programming channel names that each correspond to the numeric code, wherein the instructions to determine the particular programming channel name include instructions to:
determine that each particular programming channel name, of the plurality of programming channel names, includes at least one of the alphabetic characters in the determined set of alphabetic characters,
each programming channel name, of the plurality of programming channel manes, being associated with a television broadcast network out of a plurality of television broadcast networks, each television broadcast network being associated with a respective programming channel number in addition to a respective programming channel name, the respective programming channel numbers being independent of the numeric code;
associate each programming channel name, of the plurality of programming channel names, with a respective shortcut command, wherein the shortcut commands are independent of the programming channel names and numbers;
present the plurality of programming channel names that correspond to the numeric code, the presenting including:
presenting the respective shortcut command associated with each programming channel name, of the plurality of programming channel names;
receive, after receiving the numeric code and after presenting the shortcut commands, a particular one of the shortcut commands;
determine which particular programming channel name, of the plurality of programming channel names, corresponds to the received shortcut command;
select, based on determining that the particular programming channel name corresponds to the received shortcut command, a particular programming channel, represented by the particular programming channel name, for presentation; and present content associated with the selected particular programming channel.

18. The non-transitory computer-readable medium of claim 17, wherein one or more instructions, of the plurality of instructions, further causes the one or more processors to:

receive information identifying the plurality of programming channel names; and convert the plurality of programming channel names to respective numeric codes, wherein one or more instructions, of the plurality of instructions, to determine the particular programming channel name, causes the one or more processors to determine the particular programming channel name based on converting the plurality of programming channel names to the respective numeric codes.

19. The non-transitory computer-readable medium of claim 17, wherein the numeric code is a first numeric code, and the set of alphabetic characters is a first set of alphabetic characters, wherein one or more instructions, of the plurality of instructions, further causes the one or more processors to:

receive a second numeric code;

determine a second set of alphabetic characters that are mapped to one or more numbers included in the second numeric code;

determine an update list identifying one or more programming channel names that include:

the first set of alphabetic characters associated with the first numeric code, and the second set of alphabetic characters associated with the second numeric code; and display the updated list of the one or more programming channel names.

20. The non-transitory computer-readable medium of claim 17, wherein at least one of the shortcut commands includes a non-alphanumeric symbol.

* * * * *